United States Patent
Song et al.

(10) Patent No.: US 11,770,807 B2
(45) Date of Patent: Sep. 26, 2023

(54) METHOD FOR DETERMINING RESOURCE AREA TO BE ALLOCATED TO BANDWIDTH PART IN WIRELESS COMMUNICATION SYSTEM, AND APPARATUS THEREFOR

(71) Applicant: LG ELECTRONICS INC., Seoul (KR)

(72) Inventors: Huayue Song, Seoul (KR); Yunjung Yi, Seoul (KR); Daesung Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 158 days.

(21) Appl. No.: 17/245,477

(22) Filed: Apr. 30, 2021

(65) Prior Publication Data

US 2021/0250914 A1 Aug. 12, 2021

Related U.S. Application Data

(63) Continuation of application No. 16/863,491, filed on Apr. 30, 2020, now Pat. No. 11,039,423, which is a
(Continued)

(51) Int. Cl.
*H04W 72/04* (2023.01)

(52) U.S. Cl.
CPC .................................. *H04W 72/04* (2013.01)

(58) Field of Classification Search
CPC . H04W 72/04; H04W 72/1289; H04W 36/06; H04W 48/12; H04W 72/0453; H04L 5/0092; H04L 5/001
See application file for complete search history.

(56) References Cited

U.S. PATENT DOCUMENTS

| 10,939,415 | B2 * | 3/2021 | Islam ................... H04L 5/0064 |
| 2015/0208387 | A1 | 7/2015 | Awad et al. |

(Continued)

FOREIGN PATENT DOCUMENTS

| EP | 3664549 | 10/2020 |
| WO | WO13025547 | 2/2013 |

OTHER PUBLICATIONS

3rd Generation Partnership Project; Technical Specification Group Radio Access Network, "NR• Physical layer procedures for control (Release 15)," 3GPP TS 38.213, dated Sep. 2017, 24 pages.
(Continued)

*Primary Examiner* — Brian D Nguyen
(74) *Attorney, Agent, or Firm* — Fish & Richardson P.C.

(57) ABSTRACT

Disclosed herein is a method for determining a resource area to be allocated to a bandwidth part (BWP) in a wireless communication system. More specifically, the method performed by a terminal includes: receiving, from a network, a first resource allocation field associated with a resource allocation group (RBG) size for a first BWP and a second resource allocation field associated with an RBG size for a second BWP, on the first BWP; and when the size of the first resource allocation field is greater than the size of the second resource allocation field, determining a resource area to be allocated to the second BWP, based on a value of the first resource allocation field, which corresponds to the size of the second BWP, starting from a predefined point.

15 Claims, 8 Drawing Sheets

Related U.S. Application Data continuation of application No. PCT/KR2018/013045, filed on Oct. 30, 2018.

(60) Provisional application No. 62/616,403, filed on Jan. 11, 2018, provisional application No. 62/588,218, filed on Nov. 17, 2017, provisional application No. 62/579,137, filed on Oct. 30, 2017.

(56) References Cited

U.S. PATENT DOCUMENTS

| | | | |
|---|---|---|---|
| 2019/0021045 A1* | 1/2019 | Kim | H04W 72/042 |
| 2019/0104517 A1* | 4/2019 | Park | H04W 72/0413 |
| 2020/0267698 A1* | 8/2020 | Xing | H04W 72/042 |
| 2020/0274677 A1 | 8/2020 | Xing | |
| 2020/0296656 A1 | 9/2020 | Amuru et al. | |
| 2020/0344761 A1* | 10/2020 | Amuru | H04L 5/0091 |
| 2021/0037505 A1 | 2/2021 | Kim et al. | |

OTHER PUBLICATIONS

CATT, "POSCH and PUSCH resource allocation," R1-1717833, 3GPP TSG RAN WG1 Meeting 90bis, Prague, CZ, dated Oct. 9-13, 2017, 9 pages.

Extended European Search Report in European Appln. No. 18873565.8, dated Nov. 3, 2020, 15 pages.

Fujitsu, "Discussion on frequency domain resource allocation," R1-1715487, 3GPP TSG RAN WG1 Meeting NR#3, Nagoya, Japan, dated Sep. 18-21, 2017, 4 pages.

Guangdong OPPO Mobile Telecom, "Resource allocation for PDSCH/PUSCH," R1-1715690, 3GPP TSG RAN WG1 Meeting NR#3, Nagoya, Japan,, dated Sep. 18-21, 2017, 13 pages.

Huawei, HiSilicon, "DL/UL resource allocation and TB size determination," R1-1717078, 3GPP TSG RAN WG1 Meeting #90bis, Prague, Czech Republic, Oct. 9-13, 2017, 13 pages.

Intel Corporation, "Resource allocation and TBS," R1-1717393, 3GPP TSG RAN WG1 Meeting #90bis, Prague, Czech Republic, dated Oct. 9-13, 2017, 13 pages.

Korean Office Action in Korean Appln. No. 10-2020-7015335, dated Aug. 12, 2020, 12 pages (with English translation).

LG Electronics, "Discussion on resource allocation and TBS determination," R1-1717965, 3GPP TSG RAN WG1 Meeting 90bis, Prague, CZ, dated Oct. 9-13, 2017, 18 pages.

LG Electronics, "Remaining issues on bandwidth part operation," R1-1800384, 3GPP TSG RAN WG1 Meeting AH 1801, Vancouver, Canada, dated Jan. 22-26, 2018, 14 pages.

Nokia, Nokia Shanghai Bell, "On resource allocation for PDSCH and PUSCH in NR," R1-1715545, 3GPP TSG RAN WG1 NRAH#3, Nagoya, Japan, Sep. 18-21, 2017, 10 pages.

* cited by examiner

METHOD FOR DETERMINING RESOURCE AREA TO BE ALLOCATED TO BANDWIDTH PART IN WIRELESS COMMUNICATION SYSTEM, AND APPARATUS THEREFOR

CROSS-REFERENCE TO RELATED APPLICATIONS

This application is a continuation of U.S. application Ser. No. 16/863,491, filed on Apr. 30, 2020, now U.S. Pat. No. 11,039,423, which is a continuation of International Application No. PCT/KR2018/013045, filed on Oct. 30, 2018, which claims the benefit of U.S. Provisional Application No. 62/588,218, filed on Nov. 17, 2017, U.S. Provisional Application No. 62/579,137, filed on Oct. 30, 2017, and U.S. Provisional Application No. 62/616,403 filed on Jan. 11, 2018, the contents of which are all hereby incorporated by reference herein in their entirety.

TECHNICAL FIELD

The present disclosure relates to a wireless communication system, and particularly, to a method for determining a resource area to be allocated to a bandwidth part (BWP) and an apparatus supporting the same.

BACKGROUND

Mobile communication systems have been generally developed to provide voice services while guaranteeing user mobility. Such mobile communication systems have gradually expanded their coverage from voice services through data services up to high-speed data services. However, as current mobile communication systems suffer resource shortages and users demand even higher-speed services, development of more advanced mobile communication systems is needed.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive multiple input multiple output (MIMO), in-band full duplex, non-orthogonal multiple access (NOMA), supporting super-wide band, and device networking, have been researched.

SUMMARY

The present disclosure provides a method for interpreting scheduling DCI for resource allocation.

Furthermore, the present disclosure provides a method for interpreting fallback DCI during BWP switching.

Furthermore, the present disclosure provides a method for providing a BWP switching time through the scheduling DCI.

The technical objects of the present disclosure are not limited to the aforementioned technical objects, and other technical objects, which are not mentioned above, will be apparently appreciated by a person having ordinary skill in the art from the following description.

In an aspect, provided is a method for determining a resource area to be allocated to a bandwidth part (BWP) in a wireless communication system.

Specifically, the method performed by a terminal includes: receiving, from a network, a first resource allocation field associated with a resource allocation group (RBG) size for a first BWP and a second resource allocation field associated with an RBG size for a second BWP, on the first BWP; and when the size of the first resource allocation field is greater than the size of the second resource allocation field, determining a resource area to be allocated to the second BWP, based on a value of the first resource allocation field, which corresponds to the size of the second BWP, starting from a predefined point.

Furthermore, in the present disclosure, the RBG is a predefined value according to a bandwidth range.

Furthermore, in the present disclosure, the predefined starting point is determined by a resource block (RB) frequency of the second BWP.

Furthermore, in the present disclosure, the predefined starting point is determined by a random function.

Furthermore, in the present disclosure, the method further includes receiving, from the network, index information of the second BWP.

Furthermore, in another aspect, provided is a terminal determining a resource area to be allocated to a bandwidth part (BWP) in a wireless communication system, which includes: a radio frequency (RF) module transmitting and receiving a radio signal; and a processor functionally connected with the RF module, in which the processor is configured to receive, from a network, a first resource allocation field associated with a resource allocation group (RBG) size for a first BWP and a second resource allocation field associated with an RBG size for a second BWP, on the first BWP, and when the size of the first resource allocation field is greater than the size of the second resource allocation field, determine a resource area to be allocated to the second BWP, based on a value of the first resource allocation field, which corresponds to the size of the second BWP, starting from a predefined point.

Furthermore, in the present disclosure, the RBG is a predefined value according to a bandwidth range.

Furthermore, in the present disclosure, the predefined starting point is determined by a resource block (RB) frequency of the second BWP.

Furthermore, in the present disclosure, the predefined starting point is determined by a random function.

Furthermore, in the present disclosure, the processor is further configured to receive, from the network, index information of the second BWP.

According to the present disclosure, there is an effect that resource allocation to a bandwidth part can be effectively performed.

According to the present disclosure, there is an effect that when there is bandwidth part switching, the resource allocation is performed according to a change in size of a DCI field.

Effects obtainable in the present disclosure are not limited to the aforementioned effects and other unmentioned effects will be clearly understood by those skilled in the art from the following description.

BRIEF DESCRIPTION OF THE DRAWINGS

The accompanying drawings, which are included as part of the detailed description in order to provide a thorough understanding of the present disclosure, provide embodiments of the present disclosure and together with the description, describe the technical features of the present disclosure.

DETAILED DESCRIPTION

Figure 1:
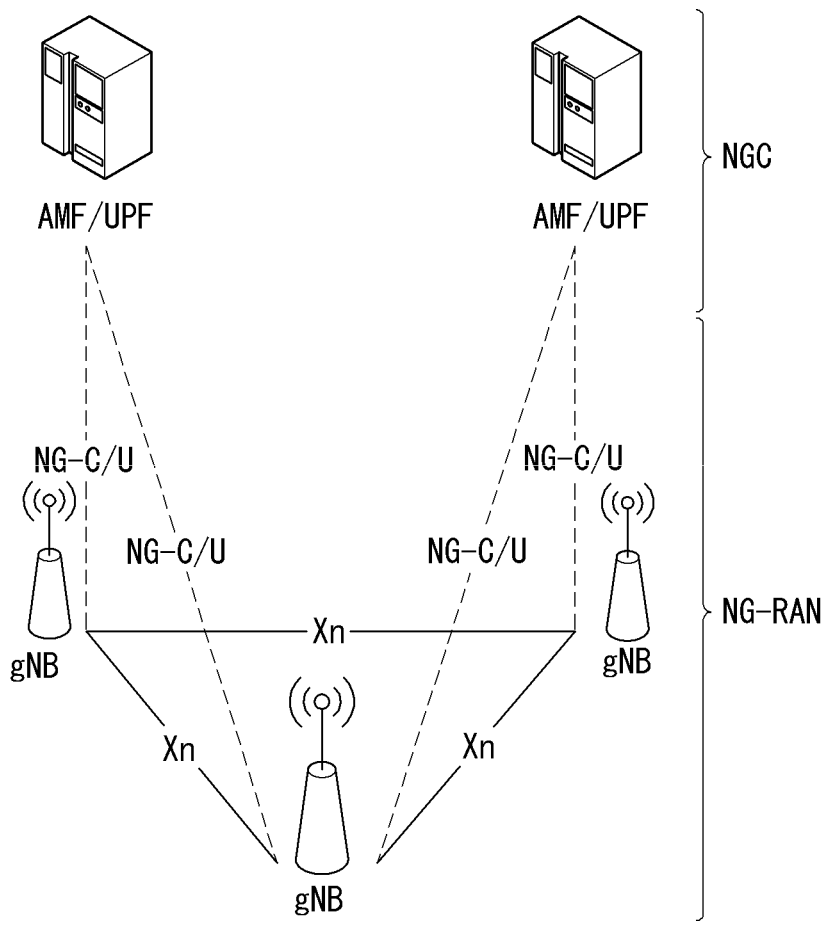
FIG. 1 is a diagram illustrating an example of an overall system architecture of NR to which a method proposed in the present disclosure may be applied.

Some embodiments of the present disclosure are described in detail with reference to the accompanying drawings. A detailed description to be disclosed along with the accompanying drawings is intended to describe some exemplary embodiments of the present disclosure and is not intended to describe a sole embodiment of the present disclosure. The following detailed description includes more details in order to provide full understanding of the present disclosure. However, those skilled in the art will understand that the present disclosure may be implemented without such more details.

In some cases, in order to avoid making the concept of the present disclosure vague, known structures and devices are omitted or may be shown in a block diagram form based on the core functions of each structure and device.

In the present disclosure, a base station has the meaning of a terminal node of a network over which the base station directly communicates with a terminal. In this document, a specific operation that is described to be performed by a base station may be performed by an upper node of the base station according to circumstances. That is, it is evident that in a network including a plurality of network nodes including a base station, various operations performed for communication with a terminal may be performed by the base station or other network nodes other than the base station. The base station (BS) may be substituted with another term, such as a fixed station, a Node B, an eNB (evolved-NodeB), a base transceiver system (BTS), or an access point (AP). Furthermore, the terminal may be fixed or may have mobility and may be substituted with another term, such as user equipment (UE), a mobile station (MS), a user terminal (UT), a mobile subscriber station (MSS), a subscriber station (SS), an advanced mobile station (AMS), a wireless terminal (WT), a machine-type communication (MTC) device, a machine-to-Machine (M2M) device, or a device-to-device (D2D) device.

Hereinafter, downlink (DL) means communication from a base station to UE, and uplink (UL) means communication from UE to a base station. In DL, a transmitter may be part of a base station, and a receiver may be part of UE. In UL, a transmitter may be part of UE, and a receiver may be part of a base station.

Specific terms used in the following description have been provided to help understanding of the present disclosure, and the use of such specific terms may be changed in various forms without departing from the technical sprit of the present disclosure.

The following technologies may be used in a variety of wireless communication systems, such as code division multiple access (CDMA), frequency division multiple access (FDMA), time division multiple access (TDMA), orthogonal frequency division multiple access (OFDMA), single carrier frequency division multiple access (SC-FDMA), and non-orthogonal multiple access (NOMA). CDMA may be implemented using a radio technology, such as universal terrestrial radio access (UTRA) or CDMA2000. TDMA may be implemented using a radio technology, such as global system for mobile communications (GSM)/general packet radio service (GPRS)/enhanced data rates for GSM evolution (EDGE). OFDMA may be implemented using a radio technology, such as Institute of electrical and electronics engineers (IEEE) 802.11 (Wi-Fi), IEEE 802.16 (WiMAX), IEEE 802.20, or evolved UTRA (E-UTRA). UTRA is part of a universal mobile telecommunications system (UMTS). 3rd generation partnership project (3GPP) Long term evolution (LTE) is part of an evolved UMTS (E-UMTS) using evolved UMTS terrestrial radio access (E-UTRA), and it adopts OFDMA in downlink and adopts SC-FDMA in uplink. LTE-advanced (LTE-A) is the evolution of 3GPP LTE.

Further, 5G new radio (NR) defines enhanced mobile broadband (eMBB), massive machine type communications (mMTC), ultra-reliable and low latency communications (URLLC), and vehicle-to-everything (V2X) based on usage scenario.

A 5G NR standard is divided into standalone (SA) and non-standalone (NSA) depending on co-existence between a NR system and a LTE system.

The 5G NR supports various subcarrier spacings and supports CP-OFDM in the downlink and CP-OFDM and DFT-s-OFDM (SC-OFDM) in the uplink.

Embodiments of the present disclosure may be supported by the standard documents disclosed in at least one of IEEE 802, 3GPP, and 3GPP2, that is, radio access systems. That is, steps or portions that belong to the embodiments of the present disclosure and that are not described in order to clearly expose the technical spirit of the present disclosure may be supported by the documents. Furthermore, all terms disclosed in this document may be described by the standard documents.

In order to more clarify a description, 3GPP LTE/LTE-A is chiefly described, but the technical characteristics of the present disclosure are not limited thereto.

Definition of Terms eLTE eNB: An eLTE eNB is an evolution of an eNB that supports a connection for an EPC and an NGC.

gNB: A node for supporting NR in addition to a connection with an NGC

New RAN: A radio access network that supports NR or E-UTRA or interacts with an NGC Network slice: A network slice is a network defined by an operator so as to provide a solution optimized for a specific market scenario that requires a specific requirement together with an inter-terminal range.

Network function: A network function is a logical node in a network infra that has a well-defined external interface and a well-defined functional operation.

NG-C: A control plane interface used for NG2 reference point between new RAN and an NGC NG-U: A user plane interface used for NG3 reference point between new RAN and an NGC Non-standalone NR: A deployment configuration in which a gNB requires an LTE eNB as an anchor for a control plane connection to an EPC or requires an eLTE eNB as an anchor for a control plane connection to an NGC Non-standalone E-UTRA: A deployment configuration an eLTE eNB requires a gNB as an anchor for a control plane connection to an NGC.

User plane gateway: A terminal point of NG-U interface

General System

FIG. 1 is a diagram illustrating an example of an overall structure of a new radio (NR) system to which a method proposed by the present disclosure may be implemented.

Referring to FIG. 1, an NG-RAN is composed of gNBs that provide an NG-RA user plane (new AS sublayer/PDCP/RLC/MAC/PHY) and a control plane (RRC) protocol terminal for a UE (User Equipment).

The gNBs are connected to each other via an Xn interface.

The gNBs are also connected to an NGC via an NG interface.

More specifically, the gNBs are connected to a Access and Mobility Management Function (AMF) via an N2 interface and a User Plane Function (UPF) via an N3 interface.

NR (New Rat) Numerology and Frame Structure

In the NR system, multiple numerologies may be supported. The numerologies may be defined by subcarrier spacing and a CP (Cyclic Prefix) overhead. Spacing between the plurality of subcarriers may be derived by scaling basic subcarrier spacing into an integer N (or μ). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an Orthogonal Frequency Division Multiplexing (OFDM) numerology and a frame structure, which may be considered in the NR system, will be described.

A plurality of OFDM numerologies supported in the NR system may be defined as in Table 1.

TABLE 1

| μ | $\Delta f = 2^{\mu} \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |

Regarding a frame structure in the NR system, a size of various fields in the time domain is expressed as a multiple of a time unit of $T_s = 1/(\Delta f_{max} \cdot N_f)$. In this case, $\Delta f_{max} = 480 \cdot 10^3$, and $N_f = 4096$. DL and UL transmission is configured as a radio frame having a section of $T_f = (\Delta f_{max} N_f / 100) \cdot T_s = 10$ ms. The radio frame is composed of ten subframes each having a section of $T_{sf} = (\Delta f_{max} N_f / 1000) \cdot T_s = 1$ ms. In this case, there may be a set of UL frames and a set of DL frames.

Figure 2:
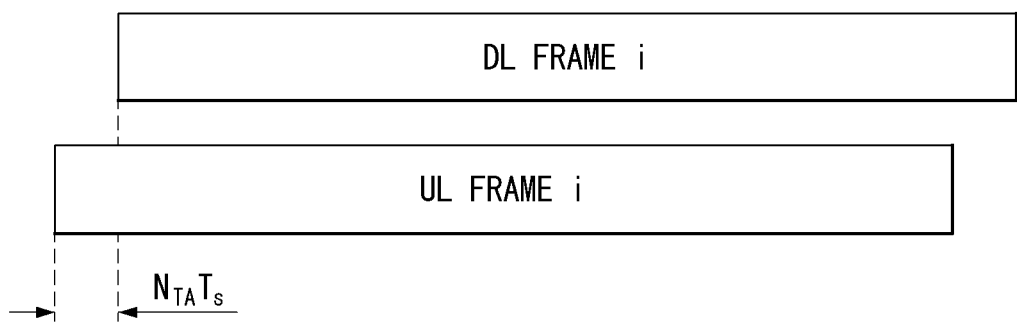
FIG. 2 illustrates a relationship between an uplink frame and a downlink frame in a wireless communication system to which a method proposed in the present disclosure may be applied.

FIG. 2 illustrates a relationship between a UL frame and a DL frame in a wireless communication system to which a method proposed by the present disclosure may be implemented.

As illustrated in FIG. 2, a UL frame number I from a User Equipment (UE) needs to be transmitted $T_{TA} = N_{TA} T_s$ before the start of a corresponding DL frame in the UE.

Regarding the numerology $\mu$, slots are numbered in ascending order of $n_s^\mu \in \{0, \ldots N_{subframe}^{slots,\mu} - 1\}$ in a subframe, and in ascending order of $n_{s,f}^\mu \in \{0, \ldots N_{frame}^{slots,\mu} - 1\}$ in a radio frame. One slot is composed of continuous OFDM symbols of $N_{symb}^\mu$, and $N_{symb}^\mu$ is determined depending on a numerology in use and slot configuration. The start of slots $n_s^\mu$, in a subframe is temporally aligned with the start of OFDM symbols $n_s^\mu N_{symb}^\mu$ in the same subframe.

Not all UEs are able to transmit and receive at the same time, and this means that not all OFDM symbols in a DL slot or an UL slot are available to be used.

Table 2 shows the number of OFDM symbols per slot for a normal CP in the numerology $\mu$, and Table 3 shows the number of OFDM symbols per slot for an extended CP in the numerology $\mu$.

TABLE 2

| | | | Slot configuration | | | |
|---|---|---|---|---|---|---|
| | | 0 | | | 1 | |
| μ | $N_{symb}^\mu$ | $N_{frame}^{slots,\mu}$ | $N_{subframe}^{slots,\mu}$ | $N_{symb}^\mu$ | $N_{frame}^{slots,\mu}$ | $N_{subframe}^{slots,\mu}$ |
| 0 | 14 | 10 | 1 | 7 | 20 | 2 |
| 1 | 14 | 20 | 2 | 7 | 40 | 4 |
| 2 | 14 | 40 | 4 | 7 | 80 | 8 |
| 3 | 14 | 80 | 8 | — | — | — |
| 4 | 14 | 160 | 16 | — | — | — |
| 5 | 14 | 320 | 32 | — | — | — |

TABLE 3

| | | | Slot configuration | | | |
|---|---|---|---|---|---|---|
| | | 0 | | | 1 | |
| μ | $N_{symb}^\mu$ | $N_{frame}^{slots,\mu}$ | $N_{subframe}^{slots,\mu}$ | $N_{symb}^\mu$ | $N_{frame}^{slots,\mu}$ | $N_{subframe}^{slots,\mu}$ |
| 0 | 12 | 10 | 1 | 6 | 20 | 2 |
| 1 | 12 | 20 | 2 | 6 | 40 | 4 |
| 2 | 12 | 40 | 4 | 6 | 80 | 8 |
| 3 | 12 | 80 | 8 | — | — | — |
| 4 | 12 | 160 | 16 | — | — | — |
| 5 | 12 | 320 | 32 | — | — | — |

NR Physical Resource

Regarding physical resources in the NR system, an antenna port, a resource grid, a resource element, a resource block, a carrier part, etc. may be considered.

Hereinafter, the above physical resources possible to be considered in the NR system will be described in more detail.

First, regarding an antenna port, the antenna port is defined such that a channel over which a symbol on one antenna port is transmitted can be inferred from another channel over which a symbol on the same antenna port is transmitted. When large-scale properties of a channel received over which a symbol on one antenna port can be inferred from another channel over which a symbol on another antenna port is transmitted, the two antenna ports may be in a QC/QCL (quasi co-located or quasi co-location) relationship. Herein, the large-scale properties may include at least one of delay spread, Doppler spread, Doppler shift, average gain, and average delay.

Figure 3:
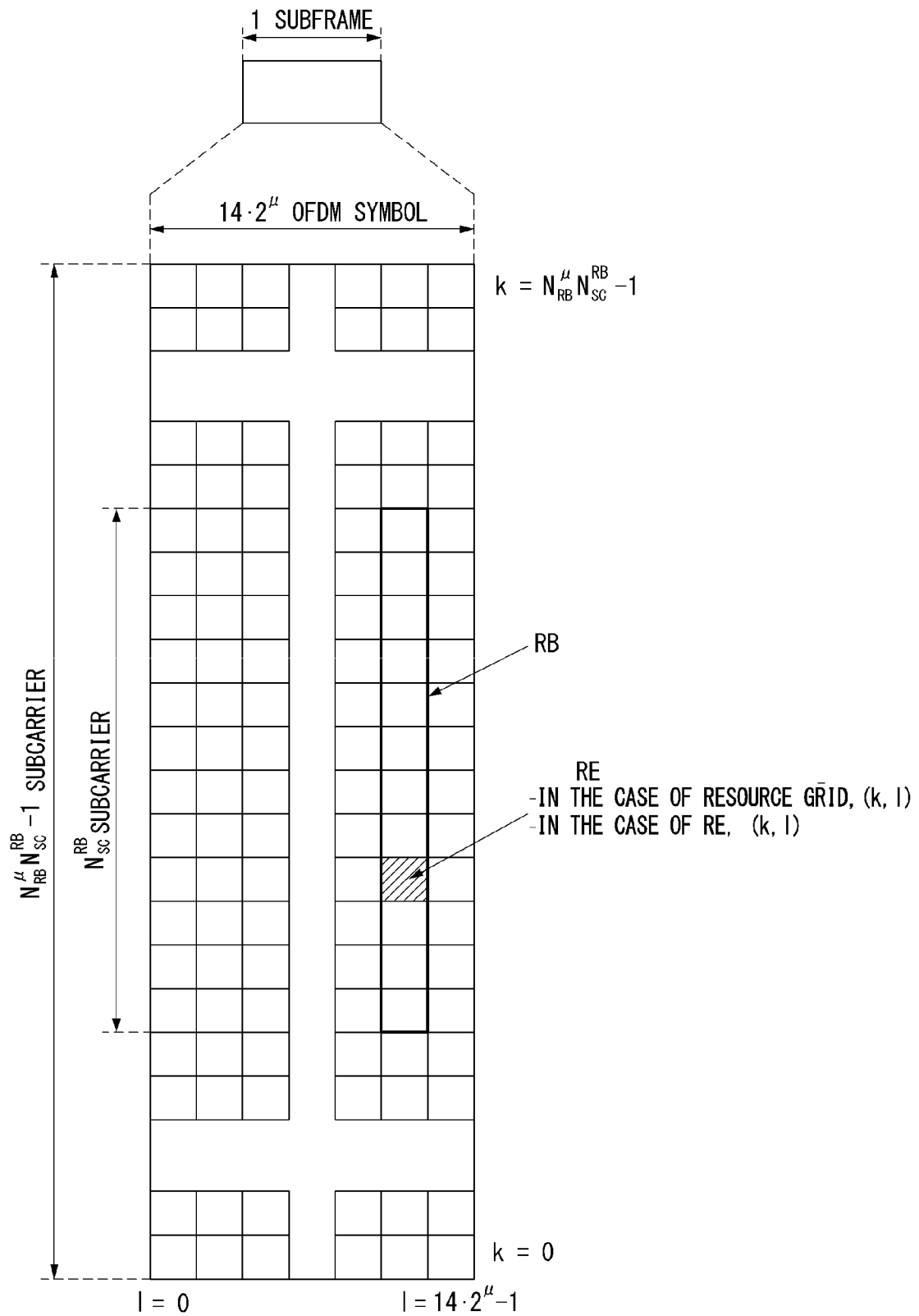
FIG. 3 illustrates one example of a resource grid supported in a wireless communication system to which a method proposed in the present disclosure may be applied.

FIG. 3 illustrates an example of a resource grid supported in a wireless communication system to which a method proposed by the present disclosure may be implemented.

Referring to FIG. 3, a resource grid is composed of $N_{RB}^{\mu} N_{sc}^{RB}$ subcarriers in a frequency domain, each subframe composed of 14·2μ OFDM symbols, but the present disclosure is not limited thereto.

In the NR system, a transmitted signal is described by one or more resource grids, composed of $N_{RB}^{\mu} N_{sc}^{RB}$ subcarriers, and $2^{\mu} N_{symb}^{(\mu)}$ OFDM symbols. Herein, $N_{RB}^{\mu} \leq N_{RB}^{max,\mu}$. The above $N_{RB}^{max,\mu}$ indicates the maximum transmission bandwidth, and it may change not just between numerologies, but between UL and DL.

In this case, as illustrated in FIG. 3, one resource grid may be configured for the numerology μ and an antenna port p.

Each element of the resource grid for the numerology μ and the antenna port p is indicated as a resource element, and may be uniquely identified by an index pair (k, ī). Herein, k=0, ..., $N_{RB}^{\mu} N_{sc}^{RB}$–1 is an index in the frequency domain, and ī=0, ..., $2^{\mu} N_{symb}^{(\mu)}$–1 indicates a location of a symbol in a subframe. To indicate a resource element in a slot, the index pair (k, ī) is used. Herein, l=0, ..., $N_{symb}^{\mu}$–1.

The resource element (k, ī) for the numerology μ and the antenna port p corresponds to a complex value $a_{k,\bar{l}}^{(p,\mu)}$. When there is no risk of confusion or when a specific antenna port or numerology is specified, the indexes p and μ may be dropped and thereby the complex value may become $a_{k,\bar{l}}^{(p)}$ or $a_{k,\bar{l}}$.

In addition, a physical resource block is defined as $N_{sc}^{RB}$=12 continuous subcarriers in the frequency domain. In the frequency domain, physical resource blocks may be numbered from 0 to $N_{RB}^{\mu}$–1. At this point, a relationship between the physical resource block number $n_{PRB}$ and the resource elements (k, l) may be given as in Equation 1.

Equation 1

$$n_{PRB} = \left\lfloor \frac{k}{N_{sc}^{RB}} \right\rfloor$$

In addition, regarding a carrier part, a UE may be configured to receive or transmit the carrier part using only a subset of a resource grid. At this point, a set of resource blocks which the UE is configured to receive or transmit are numbered from 0 to $N_{URB}^{\mu}$–1 in the frequency region.

Self-Contained Subframe Structure

A time division duplexing (TDD) structure taken into consideration in the NR system is a structure in which both uplink (UL) and downlink (DL) are processed in a single subframe. This is for minimizing latency of data transmission in the TDD system, and such a structure is called a self-contained subframe structure.

Figure 4:
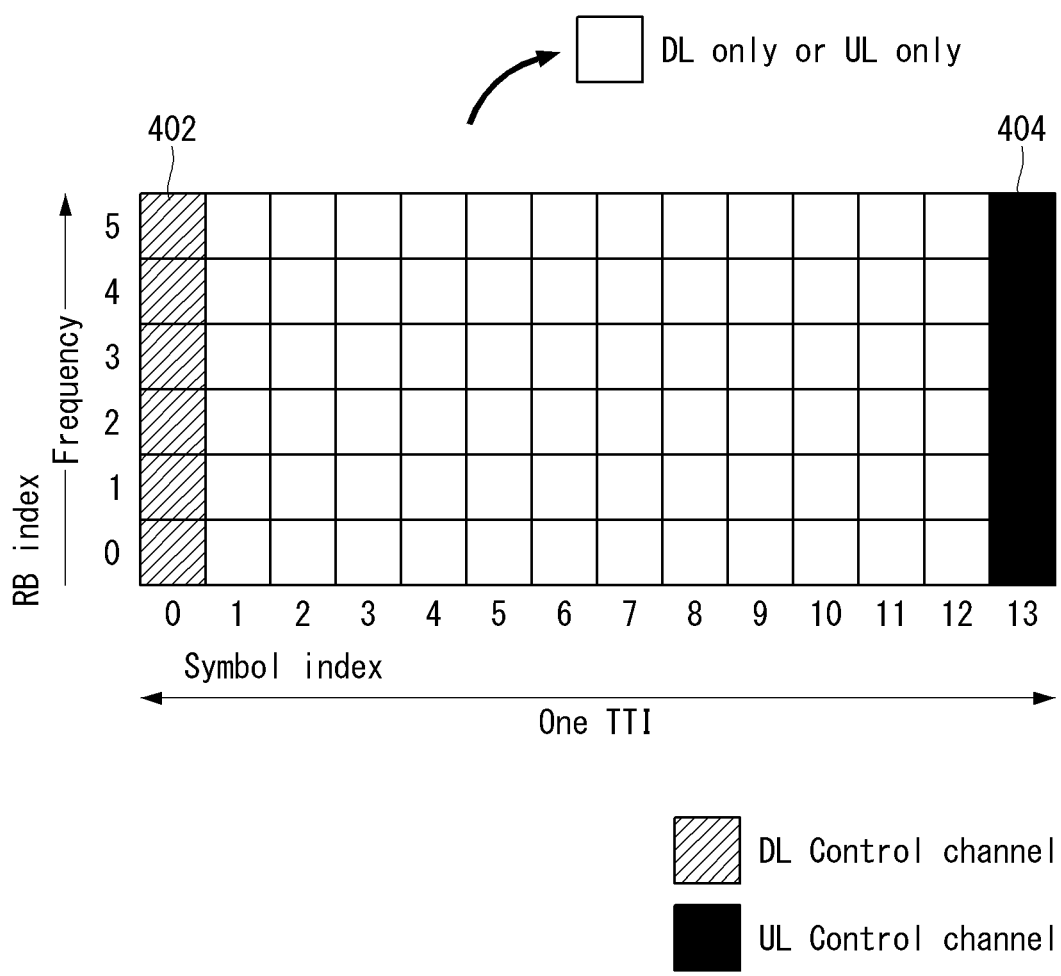
FIG. 4 illustrates an example of a self-contained subframe structure to which the method proposed in the present disclosure may be applied.

FIG. 4 shows an example of a self-contained subframe structure to which a method proposed in the present disclosure may be applied. FIG. 4 is only for convenience of description, and does not limit the scope of the present disclosure.

Referring to FIG. 4, in the case of legacy LTE, a case where one subframe includes 14 orthogonal frequency division multiplexing (OFDM) symbols is assumed.

In FIG. 4, a region 402 means a downlink control region, and a region 404 means an uplink control region. Furthermore, a region (i.e., a region not having a separate indication) other than the region 402 and the region 404 may be used for the transmission of downlink data or the transmission of uplink data.

That is, uplink control information and downlink control information are transmitted in one self-contained subframe. In contrast, in the case of data, uplink data or downlink data is transmitted in one self-contained subframe.

If the structure shown in FIG. 4 is used, downlink transmission and uplink transmission are sequentially performed in one self-contained subframe. The transmission of downlink data and the reception of uplink ACK/NACK may be performed.

As a result, when an error of data transmission occurs, the time taken up to the retransmission of data may be reduced. Accordingly, latency related to data delivery can be minimized.

In a self-contained subframe structure such as FIG. 4, a time gap for a process for a base station (eNodeB, eNB, gNB) and/or a terminal (user equipment (UE)) to switch from a transmission mode to a reception mode or a process for the base station and/or the terminal to switch from the reception mode to the transmission mode is necessary. In relation to the time gap, if uplink transmission is performed in a self-contained subframe after downlink transmission, some OFDM symbol(s) may be configured as a guard period (GP).

Analog Beamforming

A wavelength of mmW is shortened, and as a result, multiple antennas may be installed in the same area. In other words, a total of 100 antenna elements may be installed in the form of a 2-dimension array at a 0.5 lambda (wavelength, λ) interval on a panel of 5 by 5 cm with a wavelength of 1 cm in a 30 GHz band.

Therefore, in the mmW, a beamforming (BF) gain is increased to increase coverage or increase throughput by using multiple antenna elements.

In this case, if a transceiver unit (TXRU) is provided so that transmission power and phase may be adjusted for each antenna element, independent beamforming may be performed for each frequency resource.

However, when the TXRUs are installed on all of approximately 100 antenna elements, there is a problem that effectiveness is deteriorated in terms of costs.

Therefore, a scheme of mapping multiple antenna elements to one TXRU and adjusting a direction of a beam using an analog phase shifter is considered.

Such an analog beamforming scheme has a disadvantage in that frequency selective beamforming may not be performed by making only one beam direction in all bands.

A hybrid BF with B TXRUs, which is an intermediate form of digital BF and analog BF, and fewer than Q antenna elements, is considered.

In this case, although there is a difference depending on a connection scheme of B TXRUs and Q antenna elements, the number of directions of the beams that may be transmitted at the same time is limited to B or less.

A new radio (NR) system includes terminals (e.g., UE, hereinafter, referred to as UE for convenience) supporting various bandwidths (BWs).

One of goals of the NR system is to flexibly schedule all UEs by a network (NW).

Further, a configuration for Channel State Information-Reference Signal (CSI-RS) measurement also needs to be flexibly and efficiently performed.

To this end, the UE may receive a configuration for one or more bandwidth parts (BWPs) from the network.

In the NR system, each UE configures a radio frequency according to an active BWP size thereof to increase power utilization efficiency of an RF side or a baseband side.

Here, an active BWP means a BWP activated (by the network) among the configured BWPs.

In this case, the UE may return (or reconfigure) the RF in order to measure the CSI-RS according to the CSI-RS measurement configuration.

Alternatively, there may be a change on processing according to implementation of the baseband side.

Hereinafter, operations of signaling an appropriate CSI-RS measurement configuration to UEs that perform processing in various BWP states proposed in the present disclosure and operations which the UE may have based on the corresponding signaling will be described in detail.

The NR system may configure various bandwidth parts (BWPs) for one UE.

In addition, when the network (or base station) performs resource allocation for various BWPs, if the network (or base station) configures a resource block group (RBG) size appropriate for each BWP by considering the DCI size and the size of the BWP, the network (or base station) may have maximum flexibility in using a resource.

However, when the DCI according to each BWP size is provided, scheduling overhead may occur at the network side and overhead for Blind Decoding (BD) may increase at the UE side.

In order to solve such a problem, a method that may realize maximum flexibility by a more efficient resource allocation scheme is required.

Resource Allocation During DCI-Based BWP Switching

When the network switches the active bandwidth part (BWP) for one UE in the new radio (NR) system, scheduling Downlink Control Information (DCI) may be used.

In this case, a resource allocation (RA) field of the corresponding scheduling DCI needs to be defined.

The reason is that a problem that the UE may not normally interpret the scheduling DCI according to properties of BWPs before and after switching.

Therefore, the present disclosure proposes several methods for solving ambiguity for interpreting the scheduling DCI.

First, when the BWP switching is performed, the resource allocation may be configured differently according to whether the DCI field size is changed.

Further, when the resource allocation is performed, a resource block group (RBG) level may be defined according to a range of the BWP size configured for the UE.

Further, the UE may be configured with multiple BWPs from the network.

In this case, there is an index given to each BWP and when the BWP switching is required, the network transmits the index of a BWP to be switched to a field (e.g., BWP indexing field) determined for the scheduling DCI, and as a result, a process is achieved in which the UE switches to the corresponding BWP.

In addition, an execution scheme for a corresponding BWP switching command may be a scheme which is predefined according to various elements including the size and a position of the BWP and a radio frequency (RF) capability of the UE or which the network configures for the UE earlier than transmitting a switching command.

A first scheme of solving the ambiguity of the scheduling DCI is to apply one DCI format to BWPs configured for one UE and fix a value of the DCI field size.

As the fixed DCI field size, the network may configure a predetermined value for the UE and the value may be a maximum value among required RA field sizes among the configured BWPs of the UE or an RA field size required for one BWP (e.g., largest BWP).

Meanwhile, a method for matching the RA field size may be different between DCI for scheduling a Physical Downlink Shared Channel (PDSCH) and DCI for scheduling a Physical Uplink Shared Channel (PUSCH).

As an example, for the DCI for scheduling the PDSCH, an RA bit field size may be configured based on a BWP in which the corresponding DCI is transmitted.

On the contrary, for the DCI for scheduling the PUSCH, the RA bit field size may be configured based on a configured UL BWP having the largest BWP size among configured UL BWPs (and/or configured SUL BWPs).

A meaning of 'A and/or B' used in the present disclosure may be interpreted as the same meaning as 'including at least one of A or B'.

Alternatively, for a PDSCH scheduled in a BWP which is the same as the BWP in which the scheduling DCI is transmitted, the RA size may be determined based on the active BWP and when the scheduling DCI is transmitted in a different BWP from the PDSCH by a cross-carrier/cross-BWP, the PDSCH may be used by assuming a max value of the RA field of the configured BWP.

Moreover, a second scheme of solving the ambiguity of the scheduling DCI is to match mutual sizes to be the same as each other in order to reduce blind decoding (BD) attempts of the DCI for scheduling the PDSCH and the DCI for scheduling the PUSCH.

In this case, the RA bit field sizes of both the DCI for scheduling the Physical downlink shared channel (PDSCH) and the DCI for scheduling the Physical uplink shared channel (PUSCH) may be configured based on the BWP in which the corresponding DCI is transmitted by considering that the mutual sizes are matched to be the same as each other or the RA bit field sizes may be configured based on a BWP having the largest size among the configured DL BWP, the configured UL BWP, and/or the configured supplementary uplink (SUL) BWP.

Meanwhile, a BWP not used by each DCI format may be excluded when considering the (RA) field size.

For example, when RBG based RA is used only in BWPs, 1, 2, and 3 and is not used in largest BWP 4, the RA field size may be configured by considering only BWPs 1, 2, and 3.

Further, the scheme for determining the RA field size may vary depending on the DCI format or an RA type.

As an example, in the case of contiguous RA, the field size is configured from a higher layer or configured according to the active BWP, while the maximum (max) value may be considered for the RBG RA.

Alternatively, when the ambiguity may occur in the DCI size, the field size is assumed to be maximum, otherwise the field size may be configured according to a current active BWP.

As an example, in a paired spectrum (or FDD system), in the case of a UL grant, since the UE and the network may interpret a time when the UL BWP is actually changed differently from each other, the field size may be assumed to be maximum.

Here, the UE may consider several following methods by a scheme in which the UE interprets the corresponding DCI according to whether RBG sizes configured in BWPs before and after switching are the same as each other.

First, an RA field size required in a current bandwidth part (BWP) is referred to as 'K1' and an RA field size required in a new bandwidth part (BWP) is referred to as 'K2'.

(Method 1)

Method 1 refers to a case where K1 and K2 are continuously matched to be the same as each other.

In this case, a method for matching K1 and K2 to be the same as each other may be as follows.

The UE selects the RBG size according to the length of the BWP and if it is assumed that the RBG size increases to a multiple of 2 and a BWP range also increases to the multiple to 2, when K1 or K2 is determined based on a largest value in a range to which a BW of a BWP to which the UE belongs, K1 and K2 may continuously have the same value.

Referring to Table 4, an example of Method 1 will be described.

Table 4 shows an RGB size depending on a bandwidth range.

TABLE 4

| BW | RBG size |
|---|---|
| 1-50 | 2 (maximum 25 RBGs may exist) |
| 51-100 | 4 (maximum 25 RBGs may be exist) |
| 101-200 | 8 (maximum 25 RBGs may be exist) |
| 201-400 | 16 (maximum 25 RBGs may be exist) |

For example, when the BW size of the current BWP is 60 RBs, the RBG size is selected as 4 and 100 which is a maximum value in a current range is selected as a value of K1 to be determined by a scheme having a maximum of 25 RBG entries.

Since such a scheme assumes the maximum number of RBGs regardless of the RB size, such a scheme may cause additional overhead.

Accordingly, fields/bits of RBG which is not used may be used for transmission of other information.

As an example, bits/fields which are not used may be used to inform slot information indication (SFI) information to be UE-specific.

Further, similarly thereto, a smallest value or average in the range may be assumed as the K1 value.

In other words, in the case of the above example, by assuming 51 RBs, 13 RBGs are assumed and in the corresponding case, only 52 RBs among 60 RBs may be transmitted by the resource allocation.

A number of options may be considered for where 8 RBs in which the resource allocation may not be performed among 60 RBs are configured.

As an example, as many as 8 RBs may be excluded from a lowest frequency or as many as 8 RBs may be excluded from a highest frequency.

In other words, since 2 RBGs should be excluded, 2 RBG may be selected by a random function and excluded.

The random function may be a value changed by a slot index or a value changed by a UE Radio Network Temporary Identifier (RNTI).

In other words, the random function may be a value dynamically changed through the UE RNTI and a time index.

(Method 2)

Method 2 refers to a case where K1 and K2 are not the same as each other.

First, in the case of K1<K2, resource allocation for a new BWP may be configured to be performed as many as K1 RBGs sequentially from a predetermined start point of the corresponding new BWP.

In this case, the corresponding start point may become a lowest PRB or a highest RPB of the BWP or the corresponding start point may be selected by the random function.

Next, in the case of K1>K2, field/bit other than K2 may be used as other information or processed as NULL.

In other words, the UE interprets a DCI value which is as large as the BWP size from the predetermined start point and does not additionally interpret the remaining part.

On the contrary, when the size of the BWP after switching is larger than a pre-fixed DCI field size, the UE may perform the resource allocation from the start point determined above and interpret that there is no data transmitted from the network to the UE for an area not covered by the DCI.

In other words, in the current bandwidth part (BWP), RBG which is as large as a size of 'k2-k1' may not be indicated.

Accordingly, the UE may recognize that data is not scheduled to the RBG which is as large as the size of 'k2-k1'.

In this case, the UE may recognize that a part which is as large as the size of 'k2-k1' in a resource allocation field of the new bandwidth part (BWP) is subjected to zero-padding and determine the resource area.

Here, a meaning that the UE performs the resource allocation may be interpreted as a meaning that the resource area allocated to the UE is determined by considering the resource allocation (RA) field size received from the network.

Moreover, when a control resource set (CORESET) in the current BWP schedules the new BWP, the UE may apply the corresponding contents.

In addition, when the CORESET in the new BWP schedules the new BWP, the UE may assume that a DCI payload size may be changed by the RA field size of K2.

In this case, when one CORESET is shared by both the current and new BWPs, which RA field size should be assumed may become ambiguous.

In this case, the RA field size to be sued for each CORESET may be fixed or a DCI format/size may be configured more comprehensively.

Alternatively, such a value may be configured in s search space set configured in each CORESET.

Accordingly, in a case of sharing the CORESET, if the CORESET is configured by K1, k1 bit size is used as the RA field even when switching to the new BWP occurs.

In order to avoid such a situation, even though the CORESET is shared for each BWP, the configuration should be independently performed and the RA field size should be differently configured.

However, in this case, it is difficult to solve an ambiguity problem which occurs during BWP switching.

Accordingly, in a situation in which the network does not know whether the BWP switching is successful, resource allocation which is not changed may be performed in the BWP through the fallback DCI.

Moreover, actions of the networks and the UEs during a BWP switching process may be as follows.

1) The resource allocation field size is configured or the total number of RBGs which may be indicated in each CORESET for CORESET (for at least one CORESET) or search space set for each configured BWP.

Alternatively, when the CORESET is configured for each BWP, the RA field size is implicitly configured according to the BW of each BWP.

2) In the case of DCI of switching the BWP, the configuration of the current active BWP is followed.

3) In the case of DCI of not switching the BWP, the configuration of the current active BWP is followed.

4) In the case of cross-BWP scheduling, the RA field size of the new BWP may be determined according to the configuration of the current active BWP and the RA field size may be determined according to the configuration of the new BWP as below.

RBG size

RB start, end

5) When the size is different, size alignment is made through pruning or zero padding.

Such a method is that the UE receives information in the current BWP and performs the resource allocation to the new BWP based on the received information.

As a result, when the resource allocation is made through a bit size suitable for the new BWP, a problem in that the number of times of blind decoding (BD) increases due to a change in DCI format/size may be solved.

(Method 3)

When RBG sizes used in BWPs after switching by the UE are different from each other, another scheme may be as follows.

First, when the UE becomes in a stable state after performing the resource allocation based on the RBG size used in the BWP before being continued during a switching period, the UE performs the resource allocation by using the RBG size configured in the corresponding BWP.

Here, the stable state may be additionally predefined or determined by receiving an indication from the network.

Two sets of RBG sizes may be configured for each bandwidth range and the UE uses the RBG size suitable for the BWP thereof in one set (preconfiguration or default set configuration) after accessing the network.

Next, Table 5 shows a value of the DCI field size which is possible when a subband size and the RBG size are adjusted with the same size as the subband according to the number of PRBs included in the BW.

For example, when the BWP configured for the UE is constituted by 24 to 60 PRBs, if each RBG size is applied to the corresponding BWP when one subband and RBG has 4 or 8 PRBs, each DCI field size may be expressed as 6 to 15 bits or 3 to 8 bits.

TABLE 5

| Carrier bandwidth part (PRBs) | Subband Size (PRBs): 1st value, 2nd value | Number of RBGs |
| --- | --- | --- |
| 24-60 | 4, [8] | 6-15, 3-8 |
| 61-100 | 8, [16] | 8-13, 4-7 |
| 101-200 | [12], [24] | 9-17, 5-9 |
| 201-275 | 16, [32] | 13-18, 7-9 |

When the subband size and the RBG unit are different from each other, the DCI field size may be expressed as another value.

In this case, when a subband value is configured to a 1st set value in Table 5 and the fixed DCI field size is used, the corresponding fixed value may be adjusted to 18.

In this case, the 1st set value of Table 5 may be expressed as in Table 6 and it may be further appropriate to configure a subband size of a BWP having 101 to 200 PRBs to 16 other than 1 in order to align the RBG size and the subband size.

Table 6 is a table showing the RBG size depending on a BWP range while the DCI field size is fixed to 18.

TABLE 6

| Carrier bandwidth part (PRBs) | RBG size |
| --- | --- |
| 24-36 | 2 |
| 37-72 | 4 |
| 73-144 | 8 |
| 145-275 | 16 |

When a 2nd set value of Table 5 is applied, the RBG size may be configured as in Table 7 below.

Table 7 is a table showing the RBG size depending on the BWP range while the DCI field size is fixed to 9.

TABLE 7

| Carrier bandwidth part (PRBs) | RBG size |
| --- | --- |
| 24-36 | 4 |
| 37-72 | 8 |
| 73-144 | 16 |
| 145-275 | 32 |

The BWP range configurations in Tables 6 and 7 described above may have a predetermined difference from the configuration in Table 5 and when the system is operated with the configured BWP range of Table 5, the resource allocation may be performed by the scheme of Method 2 described above at the time of using the fixed DCI value.

Interpretation for Fallback DCI During BWP Switching

The UE may continuously regard fallback DCI received when not receiving a BWP switching order for the current active BWP.

In other words, when the corresponding fallback DCI schedules the DL BWP, data is received by interpreting the fallback DCI to be suitable for the current active DL BWP and when the corresponding fallback DCI schedules the UL BWP, information to be transmitted to the current active UL BWP may be transmitted.

However, when the UE receives the fallback DCI while preparing for the BWP switching after receiving the BWP switching order from the network, since there is no BWP information in the corresponding fallback DCI, there may be the ambiguity in interpreting the fallback DCI by the UE.

Hereinafter, a scheme of solving the problem will be proposed.

First, from the viewpoint of an unpaired spectrum, since the UE switches both the DL and UL BWPs according to the DL scheduling DCI or the UL scheduling DCI, the UE may interpret the fallback DCI like two following methods in the case of receiving the fallback DCI.

In this case, the unpaired spectrum means a TDD mode.

(Method 1

When the fallback DCI is determined to be continuously applied to the received BWP, the UE may process data scheduled from the fallback DCI and perform the BWP switching in the current active bandwidth part (BWP) regardless of whether to receive the DCI for the BWP switching.

However, in this case, a BWP switching related process also needs to be defined together.

For example, when the UE performs the BWP switching by delaying a time spent while processing the data scheduled from the fallback DCI or receives the BWP switching order according to an indication of the network or a predefined rule and then receives the fallback DCI, the UE may disregard the received fallback DCI and normally perform the BWP switching.

(Method 2)

The UE may apply the fallback DCI received before receiving the BWP switching order to the current active BWP and apply the fallback DCI received after receiving the BWP switching order to the BWP after switching other than the current active BWP.

In this case, interpretation of the RA field of the fallback DCI may have various interpretation schemes according to the BWP before and after switching as described in the above section.

Next, a scheme in which the UE interprets the fallback DCI in a paired spectrum will be described below.

In the case of the interpretation of the fallback DCI for DL BWP scheduling in the paired spectrum, the fallback DCI may be interpreted in the same scheme as the unpaired spectrum.

However, there may be the ambiguity in interpreting the fallback DCI for UL BWP scheduling.

In this case, the aired spectrum means an FDD mode.

The reason for the existence of the ambiguity may be interpreted as the following reason.

The network may not accurately determine whether the UE may successfully switch the UL BWP according to a UL BWP switching order.

In this case, it may not be clear which BWP is scheduled to subsequently transmitted fallback DCI.

Accordingly, when the fallback DCI for the UL BWP scheduling is configured in the paired spectrum, the problem should be considered and several methods for solving the problem are proposed.

(Method 1

Method 1 relates to a method for performing a predetermined process for the UL BWP scheduled by the fallback DCI transmitted after BWP switching DCI.

1-1) The PUSCH scheduled by the fallback DCI is transmitted in the active UL BWP at the time of transmitting the corresponding DCI.

Here, it may not be expected that UL BWPs at the time when the fallback DCI scheduling PUSCH is transmitted and the time when the corresponding PUSCH is transmitted are changed.

If the situation is permitted, the UE may not expect PUSCH transmission.

1-2) The UL BWP scheduled by the fallback DCI is continuously determined as an initial UL BWP.

In this case, since RA bit field sizes for all UEs may be configured to be the same as each other, scheduling may be easier from the viewpoint of the network.

However, from the viewpoint of the UE, when the current activated BWP or the switched BWP is not an initial BWP, the UE should continuously process a scheduled resource by using a predetermined gap (retuning time+processing time for Tx data) and when the corresponding gap is not sufficient, the UE may skip the entirety or a part of resource processing (PUSCH transmission).

1-3) The UL BWP scheduled by the fallback DCI is continuously determined as the current activated BWP or the BWP after switching.

In this case, when the BWP scheduled by the fallback DCI is the current activated BWP, the RA bit field size may be continuously maintained to a configured value, but a timing of UL BWP switching by the UE may be delayed.

Accordingly, when the BWP scheduled by the fallback DCI is determined as the BWP after switching, there is a time delay described above, but the UE needs to clearly interpret a configuration of the RA bit field size before and after BWP switching.

In this case, a scheme described in the resource allocation during DCI-based BWP switching may be used.

1-4) A UL BWP in which the PUSCH scheduled by the fallback DCI is to be transmitted through a high layer signaling may be configured.

More characteristically, the PUSCH may be transmitted in a BWP corresponding to a specific state (e.g., 00 state) among the configured UL BWP or SUL BWP.

In this case, a scheduling timing for the PUSCH may include retuning and when there is no sufficient time in the corresponding retuning, the UE may skip the entirety or a part of PUSCH transmission.

The aforementioned schemes may be different from each other according to a type of search space in which the fallback DCI is transmitted.

As an example, the UE may operate as 1) or 2) when the fallback DCI is transmitted in a common search space or during an RRC configuration or before the configuration and operate as 1) or 3) when the fallback DCI is transmitted in a UE-specific search space or after the RRC configuration.

(Method 2

Method 2 is a method for determining what UL BWP the UE schedules according to the type of fallback DCI transmitted after BWP switching DCI.

In this case, an indicator for what BWP the corresponding DCI schedules is required for the RA bit field.

When the corresponding DCI is applied to one of two BWPs before and after BWP switching, a 1-bit flag may be added.

Then, the network determines a BWP switching capability, a communication channel environment, and the like of the UE to determine a BWP more suitable for applying the fallback DCI for the UE.

Next, a method for configuring the RA bit field size at the time of scheduling the PDSCH or PUSCH by the fallback DCI will be described.

(Method 1

Method 1 is a method for configuring the RA bit field sizes of the fallback DCI for scheduling the PDSCH and the fallback DCI for scheduling the PUSCH based on a DL BWP (e.g., size, RBG size, the number of RBGs) in which the corresponding DCI is transmitted.

Such a method may be easy to adjust a plurality of DCI format sizes to be the same as each other.

More characteristically, the RA bit field size of the fallback DCI for scheduling the PUSCH may be configured based on a UL BWP linked with the DL BWP in which the corresponding DCI is transmitted.

The method may be limited to a case where the corresponding serving cell is the unpaired spectrum.

Alternatively, the RA bit field size of the fallback DCI for scheduling the PUSCH may be configured based on the initial UL BWP.

(Method 2)

Method 2 is a method for configuring link directions of the RA bit field sizes of the fallback DCI for scheduling the PDSCH and the fallback DCI for scheduling the PUSCH, respectively based on a maximum size among the configured BWPs.

Specifically, the RA bit field size of the DCI for scheduling the PDSCH is configured based on the maximum size among the configured DL BWPs and the RA bit field size of the DCI for scheduling the PUSCH is configured based on the maximum size among the configured UL BWPs and/or the configured SUL BWPs.

(Method 3)

Method 3 is a method for configuring the RA bit field sizes of the fallback DCI for scheduling the PDSCH and the fallback DCI for scheduling the PUSCH based on the maximum size among all BWPs (e.g., DL BWP and/or UL BWP, and/or SUL BWP) configured for the corresponding UE.

(Method 4)

Method 4 is a method for assuming the fallback DCI shares the format and the size with broadcast DCI and assuming that the corresponding RA field size is used.

The RA size of broadcast scheduling DCI may be determined as an area in which a broadcast PDSCH may be scheduled is configured through a higher layer or may follow a continuously determined predetermined value (e.g., UE minimum BW).

In other words, an action of matching the sizes of the fallback DCI and another broadcast scheduling DCI may be considered.

The schemes may be different from each other according to the type of search space in which the fallback DCI is transmitted.

As an example, the UE may operate as Method 1 or 4 when the fallback DCI is transmitted in a common search space or during an RRC configuration or before the configuration and operate as Method 2 or 3 when the fallback DCI is transmitted in a UE-specific search space or after the RRC configuration.

Further, the schemes may be different from each other even according to whether the serving cell is the paired spectrum or the unpaired spectrum.

BWP Switching Time for Scheduling DCI

When the BWP is switched based on scheduling DCI, a scheme of interpreting the resource allocation and a time of switching the BWP should be clear from the viewpoint of the network and the UE.

Otherwise, since areas of bandwidths viewed by the network and the UE are different from each other, a problem may occur in data transmission/reception.

Accordingly, hereinafter, several following methods are proposed in order to solve the problem.

(Method 1

The UE performs BWP switching during determined time duration before data scheduled to the new BWP starts.

In other words, in the paired spectrum a time of switching the DL BWP may be configured based on a time when the PDSCH of a new DL BWP is transmitted and a time of switching the UL BWP may be configured based on a time when the PUSCH of a new UL BWP is transmitted, and in the unpaired spectrum, the time of switching the DL BWP or the time of switching the UL BWP may be configured based on the time when the PDSCH or PUSCH of the new DL/UL BWP is transmitted.

In this case, a time when the PDSCH or PUSCH is transmitted in the new BWP may be predefined or configured from the network before the UE receives the BWP switching DCI.

Further, the UE may continuously monitor the current BWP up to a time when the BWP switching DCI is received and data of the new BWP is scheduled.

However, a time required for BWP switching may vary depending on the capability of the UE and any BWP is not monitored during the corresponding period.

Since the BWP switching period (a period when any BWP is not monitored) of the UE may be diversified due to a UE phenomenon, a value which may be supported by all UEs may be configured in the system or the network may configure different values according to reported capabilities of the UE.

(Method 2)

The UE performs the BWP switching after successfully decoding the switching DCI.

In this method, faster BWP switching may be performed than Method 1, but when the UE misses the corresponding switching DCI or fails to decoding, the UE may have a different appreciation from the network.

Accordingly, the BWP switching period in Method 2 may be configured to the supported by all UEs or a UE-specific value according to the capability of the UE like the aforementioned scheme.

Moreover, the network may not know whether the UE decodes the corresponding switching DCI and completes the progress of the BWP switching.

In this case, in order to avoid the UE and the network from making different appreciations, the network should transmit control/data to both the new BWP and an old BWP.

The UE may have several following options for switching time processing when an HARQ process for a previous slot(s) is not terminated at a switching point.

(Option 1)

The UE performs the HARQ process regardless of the switching time determined above and when the HARQ process is terminated, the UE switches the BWP to the new BWP.

Since the network knows a time when the UE transmits ACK/NACK, the network may recognize that the UE performs the BWP switching after the time.

(Option 2)

At the switching time determined above, the UE may perform the BWP switching and continuously perform the HARQ process in the new BWP or stop the corresponding HARQ and wait for a new command in the new BWP.

Further, the BWP switching DCI and the scheduling DCI for the current BWP may be simultaneously transmitted to the current BWP of the UE.

In this case, when control information may be monitored without transmitting data immediately after switching to the new BWP, combined DCI may be transmitted to the current BWP.

In other words, one DCI is transmitted instead of transmitting two DCIs and a BWP indication for the corresponding DCI may be configured for the new BWP and resource allocation information may be configured for the current BWP.

In such a scheme, resources of a control region may be saved, but for which BWP a resource allocation field of the DCI is needs to be indicated.

Next, a method for performing resource allocation to the bandwidth part (BWP) proposed in the present disclosure will be described.

Figure 5:
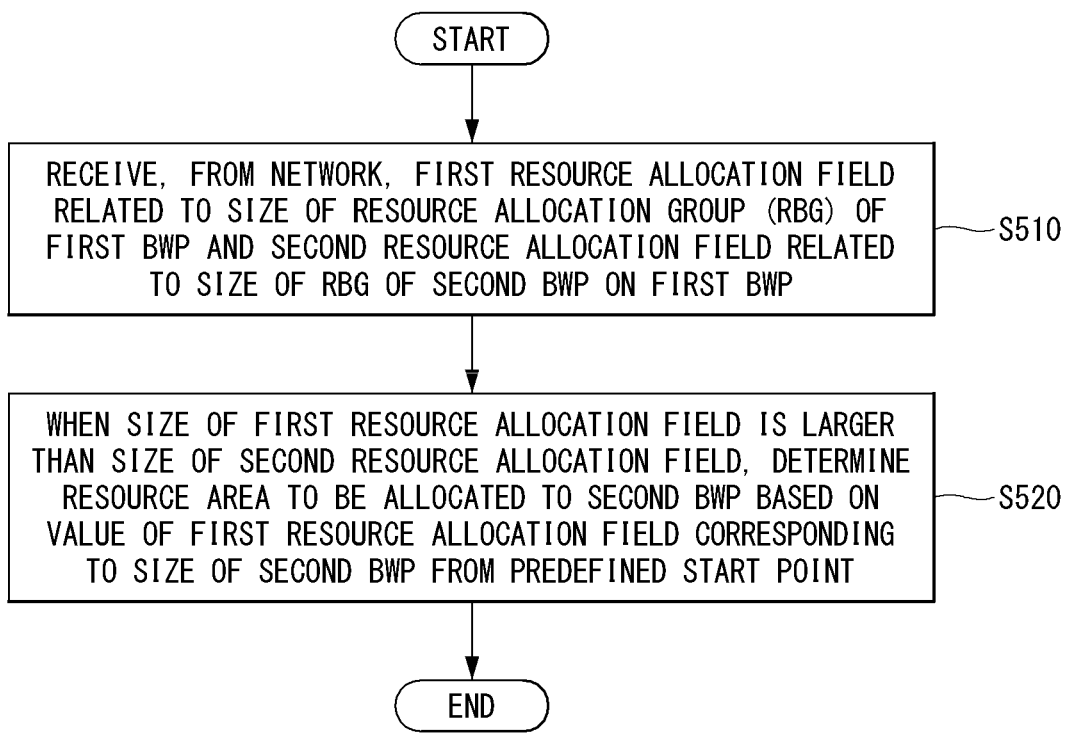
FIG. 5 is a flowchart showing an example of an operating method of a UE determining a resource area to be allocated to a bandwidth part proposed I the present disclosure.

FIG. 5 is a flowchart showing an example of an operating method of a UE performing resource allocation proposed in the present disclosure.

First, the UE receives, from a network, a first resource allocation field associated with a resource allocation group (RBG) size for a first BWP and a second resource allocation field associated with an RBG size for a second BWP, on the first BWP (S510).

Next, when the size of the first resource allocation field is greater than the size of the second resource allocation field, the UE may perform resource allocation to the second BWP, based on a value of the first resource allocation field, which corresponds to the size of the second BWP, starting from a predefined point (S520).

In this case, the RBG may be a value predetermined at every bandwidth range.

Specifically, in step S520, when the size of the first resource allocation field is larger than the size of the second resource allocation field, it may be meant that bits are interpreted as large as a resource allocation field size required for the size of the second BWP from the predefined starting point and the remaining parts are not interpreted.

Here, the meaning that the remaining parts are not interpreted may mean that the remaining bit fields are used as another information or used as NULL.

In other words, it may be interpreted that the UE performs the resource allocation as large as the size of the second BWP and there is no data transmitted to the UE for the remaining parts, in performing the resource allocation.

Overview of Devices to Which Present Disclosure is Applicable

Figure 6:
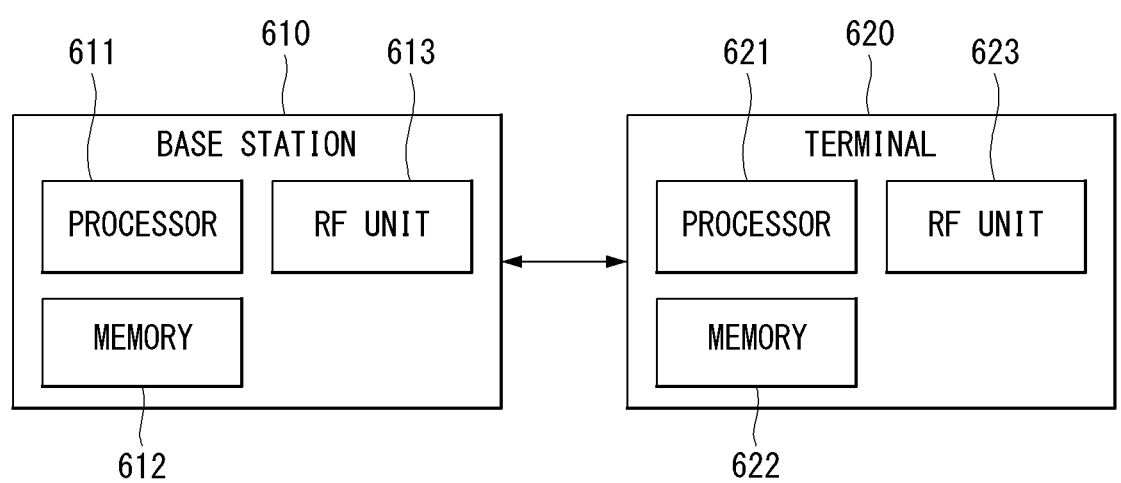
FIG. 6 is a block diagram of a wireless communication device to which methods proposed in the present disclosure may be applied.

FIG. 6 is a block diagram of a wireless communication device to which methods proposed in the present disclosure may be applied.

Referring to FIG. 6, a wireless communication system includes an eNB 610 and multiple UEs 610 positioned within an area of the eNB 620.

Each of the eNB and the UE may be expressed as a wireless device.

The eNB 610 includes a processor 611, a memory 612, and a radio frequency (RF) module 613.

The processor 611 implements a function, a process, and/or a method which are proposed in FIGS. 1 to 5 above. Layers of a radio interface protocol may be implemented by the processor. The memory 612 is connected with the processor to store various information for driving the processor. The RF module 613 is connected with the processor to transmit and/or receive a radio signal.

The UE 620 includes a processor 621, a memory 622, and an RF module 623.

The processor 621 implements a function, a process, and/or a method which are proposed in FIGS. 1 to 5 above. Layers of a radio interface protocol may be implemented by the processor. The memory 622 is connected with the processor to store various information for driving the processor. The RF module 623 is connected with the processor to transmit and/or receive a radio signal.

The memories 612 and 622 may be positioned inside or outside the processors 611 and 621 and connected with the processors 611 and 621 by various well-known means.

Further, the eNB 610 and/or the UE 620 may have a single antenna or multiple antennas.

Figure 7:
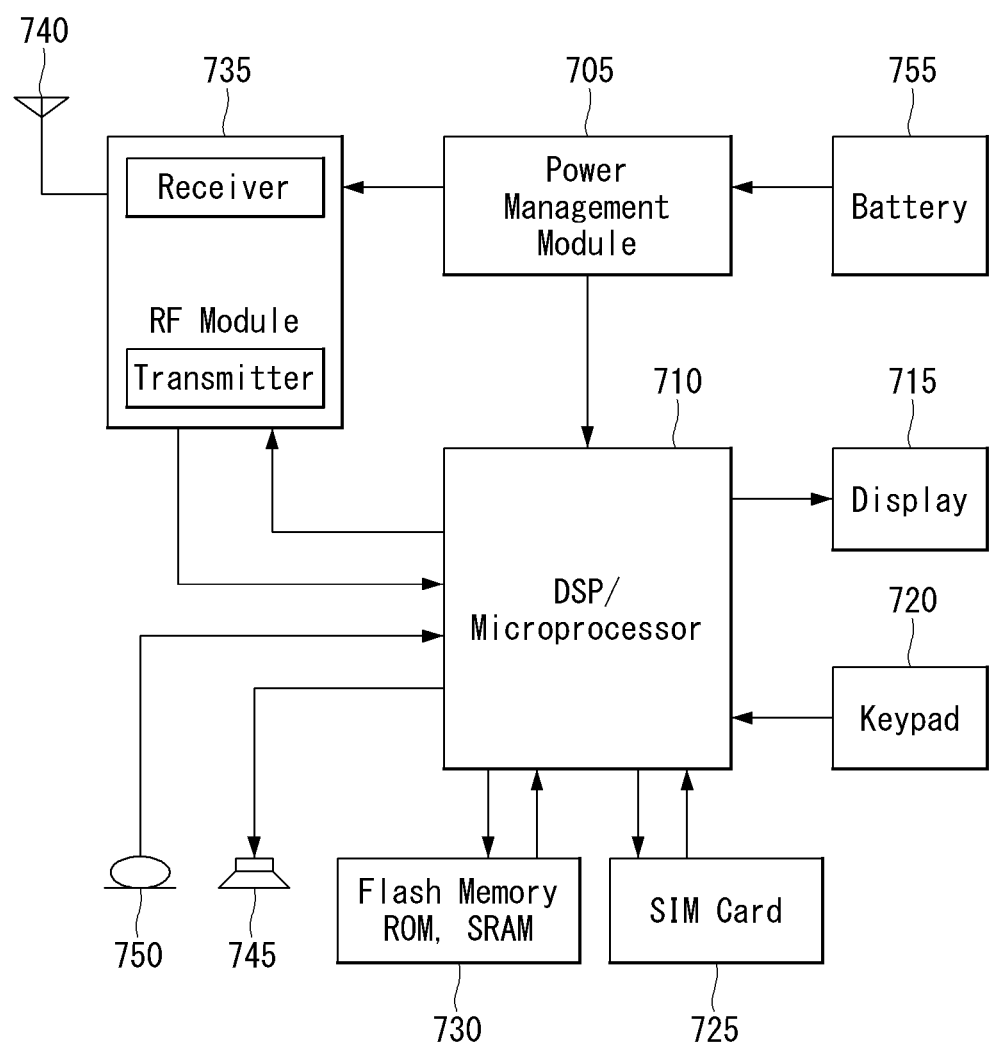
FIG. 7 is a block diagram of a communication device according to an embodiment of the present disclosure.

FIG. 7 is a block diagram of a communication device according to an embodiment of the present disclosure.

In particular, FIG. 7 is a diagram more specifically illustrating the UE of FIG. 6 above.

Referring to FIG. 7, the UE may be configured to include a processor (or a digital signal processor (DSP) 710, an RF module (or RF unit) 735, a power management module 705, an antenna 740, a battery 755, a display 715, a keypad 720, a memory 730, a subscriber identification module (SIM) card 725 (this component is optional), a speaker 745, and a microphone 750. The UE may also include a single antenna or multiple antennas.

The processor 710 implements a function, a process, and/or a method which are proposed in FIGS. 1 to 6 above. The layers of the radio interface protocol may be implemented by the processor.

The memory 730 is connected with the processor and stores information related with an operation of the processor. The memory may be positioned inside or outside the processor and connected with the processor by various well-known means.

A user inputs command information such as a telephone number or the like by, for example, pressing (or touching) a button on the keypad 720 or by voice activation using the microphone 750. The processor receives such command information and processes to perform appropriate functions including dialing a telephone number. Operational data may be extracted from the SIM card 725 or the memory. In addition, the processor may display command information or drive information on the display 715 for the user to recognize and for convenience.

The RF module 735 is connected with the processor to transmit and/or receive an RF signal. The processor transfers the command information to the RF module to initiate communication, for example, to transmit radio signals constituting voice communication data. The RF module is constituted by a receiver and a transmitter for receiving and transmitting the radio signals. The antenna 740 functions to transmit and receive the wireless signals. Upon receiving the radio signals, the RF module may transfer the signal for processing by the processor and convert the signal to a baseband. The processed signal may be converted into to audible or readable information output via the speaker 745.

Figure 8:
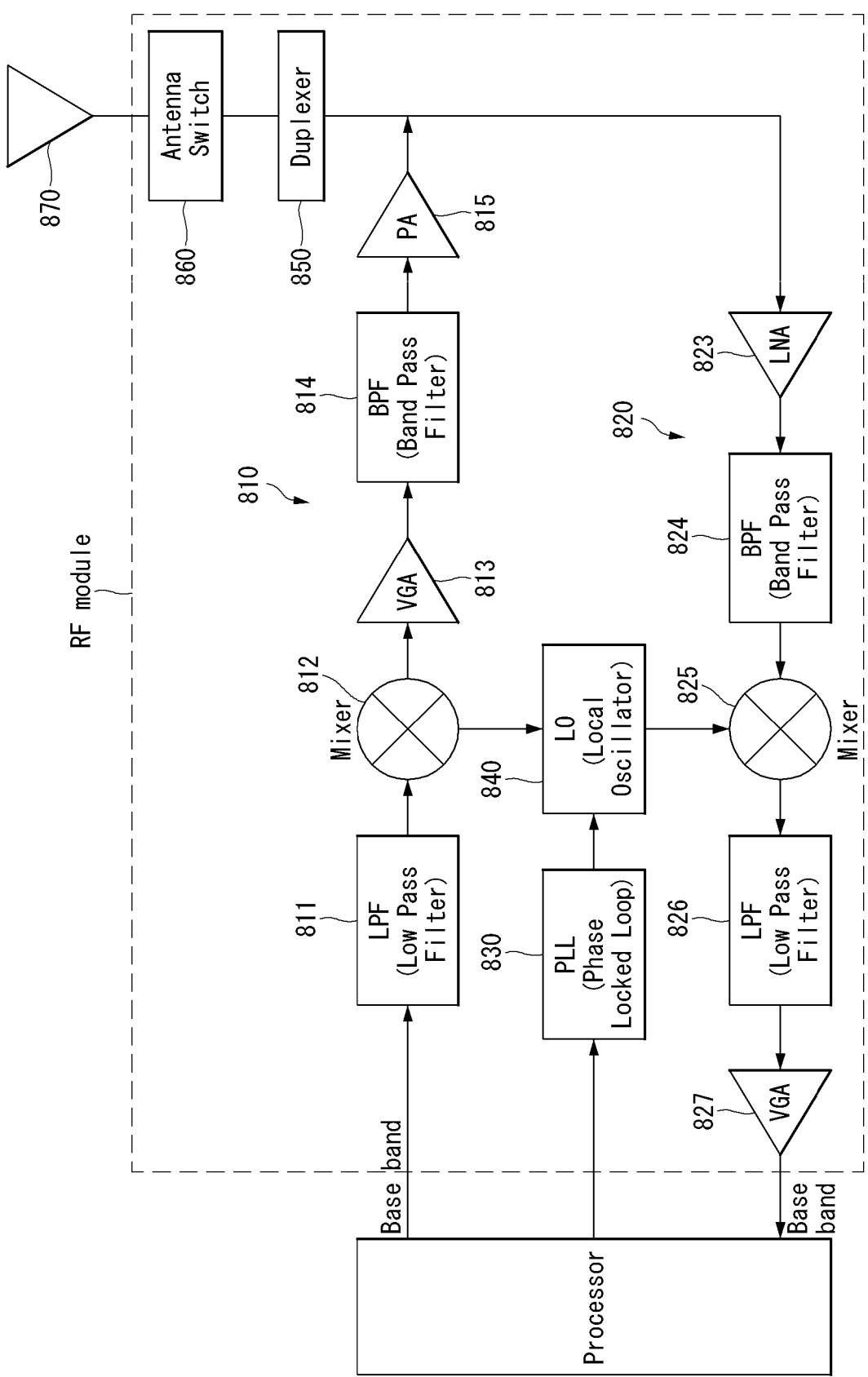
FIG. 8 is a diagram illustrating one example of an RF module of a wireless communication device to which a method proposed in the present disclosure may be applied.

FIG. 8 is a diagram illustrating one example of an RF module of a wireless communication device to which a method proposed in the present disclosure may be applied.

Specifically, FIG. 8 illustrates an example of an RF module that may be implemented in a frequency division duplex (FDD) system.

First, in a transmission path, the processors described in FIGS. 6 and 7 process the data to be transmitted and provide an analog output signal to the transmitter 810.

Within the transmitter 810, the analog output signal is filtered by a low pass filter (LPF) 811 to remove images caused by a digital-to-analog conversion (ADC) and up-converted to an RF from a baseband by an up-converter (mixer) 812, and amplified by a variable gain amplifier (VGA) 813 and the amplified signal is filtered by a filter 814, additionally amplified by a power amplifier (PA) 815, routed through a duplexer(s) 850/an antenna switch(es) 860, and transmitted through an antenna 870.

In addition, in a reception path, the antenna 870 receives signals from the outside and provides the received signals, which are routed through the antenna switch(es) 860/duplexers 850 and provided to a receiver 820.

In the receiver 820, the received signals are amplified by a low noise amplifier (LNA) 823, filtered by a bans pass filter 824, and down-converted from the RF to the baseband by a down-converter (mixer) 825.

The down-converted signal is filtered by a low pass filter (LPF) 826 and amplified by a VGA 827 to obtain an analog input signal, which is provided to the processors described in FIGS. 6 and 7.

Further, a local oscillator (LO) generator 840 also provides transmitted and received LO signals to the up-converter 812 and the down-converter 825, respectively.

In addition, a phase locked loop (PLL) 830 receives control information from the processor to generate the transmitted and received LO signals at appropriate frequencies and provides control signals to the LO generator 840.

Further, circuits illustrated in FIG. 8 may be arranged differently from the components illustrated in FIG. 8.

Figure 9:
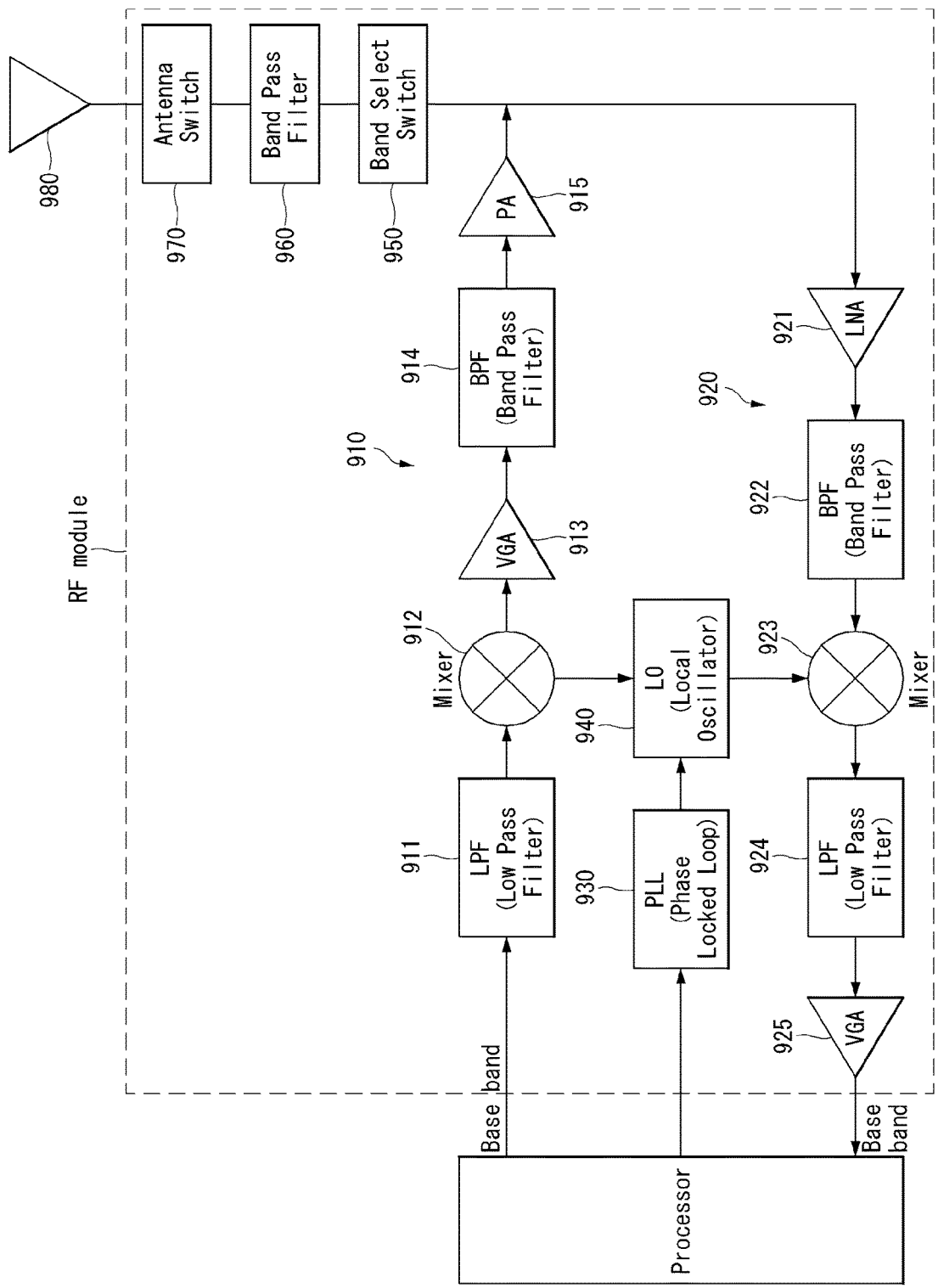
FIG. 9 is a diagram illustrating another example of the RF module of the wireless communication device to which a method proposed in the present disclosure may be applied.

FIG. 9 is a diagram illustrating another example of the RF module of the wireless communication device to which a method proposed in the present disclosure may be applied.

Specifically, FIG. 9 illustrates an example of an RF module that may be implemented in a time division duplex (TDD) system.

A transmitter 910 and a receiver 920 of the RF module in the TDD system are identical in structure to the transmitter and the receiver of the RF module in the FDD system.

Hereinafter, only the structure of the RF module of the TDD system that differs from the RF module of the FDD system will be described and the same structure will be described with reference to a description of FIG. 8.

A signal amplified by a power amplifier (PA) 915 of the transmitter is routed through a band select switch 950, a band pass filter (BPF) 960, and an antenna switch(es) 970 and transmitted via an antenna 980.

In addition, in a reception path, the antenna 980 receives signals from the outside and provides the received signals, which are routed through the antenna switch(es) 970, the band pass filter 960, and the band select switch 950 and provided to the receiver 920.

In the embodiments described above, the components and the features of the present disclosure are combined in a predetermined form. Each component or feature should be considered as an option unless otherwise expressly stated. Each component or feature may be implemented not to be associated with other components or features. Further, the embodiment of the present disclosure may be configured by associating some components and/or features. The order of the operations described in the embodiments of the present disclosure may be changed. Some components or features of any embodiment may be included in another embodiment or replaced with the component and the feature corresponding to another embodiment. It is apparent that the claims that are not expressly cited in the claims are combined to form an embodiment or be included in a new claim by an amendment after the application.

The embodiments of the present disclosure may be implemented by hardware, firmware, software, or combinations thereof. In the case of implementation by hardware, according to hardware implementation, the exemplary embodiment described herein may be implemented by using one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

In the case of implementation by firmware or software, the embodiment of the present disclosure may be implemented in the form of a module, a procedure, a function, and the like to perform the functions or operations described above. A software code may be stored in the memory and executed by the processor. The memory may be positioned inside or outside the processor and may transmit and receive data to/from the processor by already various means.

It is apparent to those skilled in the art that the present disclosure may be embodied in other specific forms without departing from essential characteristics of the present disclosure. Accordingly, the aforementioned detailed description should not be construed as restrictive in all terms and should be exemplarily considered. The scope of the present disclosure should be determined by rational construing of the appended claims and all modifications within an equivalent scope of the present disclosure are included in the scope of the present disclosure.

Although a method for performing measurement in a wireless communication system of the present disclosure has been described with reference to an example applied to a 3GPP LTE/LTE-A system or a 5G system (New RAT system), the scheme may be applied to various wireless communication systems in addition to the 3GPP LTE/LTE-A system or 5G system.

What is claimed is:

1. A method performed by a terminal in a wireless communication system, the method comprising:
   receiving, from a network, downlink control information (DCI) including an information field and a bandwidth part indicator; and
   based on a first size of the information field being larger than a second size required for the BWP that is indicated by the bandwidth part indicator, interpreting the DCI using a number of bits equal to the second size required for the BWP that is indicated by the bandwidth part indicator.

2. The method of claim 1, wherein the information field is related to a resource block group (RBG), and
   wherein the RBG is a predefined value according to a bandwidth range.

3. The method of claim 1, further comprising:
   based on the first size of the information field being smaller than the second size required for the BWP that is indicated by the bandwidth part indicator, determining a resource allocation for the BWP starting from a predefined point of the BWP.

4. The method of claim 3, wherein the predefined point is determined by a resource block (RB) frequency of the BWP.

5. The method of claim 3, wherein the predefined point is determined by a random function.

6. The method of claim 1, further comprising:
   receiving, from the network, configuration information for multiple BWP.

7. The method of claim 1, wherein the DCI is received on an active downlink (DL) BWP and the BWP is an uplink (UL) BWP.

8. The method of claim 1, wherein an active uplink (UL) BWP is switched by the bandwidth part indicator.

9. A terminal in a wireless communication system, the terminal comprising:
   a transceiver transmitting and receiving a radio signal; and
   at least one processor functionally connected with the transceiver,
   wherein the at least one processor is configured to:
   receive, from a network, downlink control information (DCI) including an information field and a bandwidth part indicator;
   based on a first size of the information field that being larger than a segond size required for the BWP that is indicated by the bandwidth part indicator, interpret the DCI using a number of bits equal to the second size required for the BWP that is indicated by the bandwidth part indicator field.

10. The terminal of claim 9, wherein the information field is related to a resource block group (RBG), and
    wherein the RBG is a predefined value according to a bandwidth range.

11. The terminal of claim 9, wherein the at least one processor is further configured to:

based on the first size of the information field being smaller than the second size required for the BWP that is indicated by the bandwidth part indicator, determine a resource allocation for the BWP starting from a predefined point of the BWP.

12. The terminal of claim 11, wherein the predefined point is determined by a resource block (RB) frequency of the second BWP.

13. The terminal of claim 11, wherein the predefined point is determined by a random function.

14. The terminal of claim 9, wherein the DCI is received on an active downlink (DL) BWP and the BWP is an uplink (UL) BWP.

15. The terminal of claim 9, wherein an active uplink (UL) BWP is switched by the bandwidth part indicator.

* * * * *